US009017170B2

(12) United States Patent
Olofsson et al.

(10) Patent No.: US 9,017,170 B2

(45) Date of Patent: Apr. 28, 2015

(54) METHOD AND APPARATUS FOR INTERACTIVE GAMEPLAY ACROSS MULTIPLE COMPUTING PLATFORMS

(75) Inventors: Jonas Olofsson, Stockholm (SE); Patrik Stymne, Stockholm (SE); Lars Sjodin, Stockholm (SE); Sebastian Knutsson, Stockholm (SE)

(73) Assignee: King.Com Limited, St. Julians (MT)

( * ) Notice: Subject to any disclaimer, the term of this patent is extended or adjusted under 35 U.S.C. 154(b) by 0 days.

(21) Appl. No.: 13/479,107

(22) Filed: May 23, 2012

(65) Prior Publication Data

US 2013/0316832 A1 Nov. 28, 2013

(51) Int. Cl.

| | |
|---|---|
| ***A63F 9/24*** | (2006.01) |
| ***A63F 13/00*** | (2014.01) |
| ***A63F 13/30*** | (2014.01) |
| ***G07F 17/32*** | (2006.01) |

(52) U.S. Cl.

CPC ............ *A63F 13/12* (2013.01); *G07F 17/3204* (2013.01); *G07F 17/3223* (2013.01); *G07F 17/3276* (2013.01)

(58) Field of Classification Search

CPC .................. A63F 13/30–13/32; A63F 13/323; A63F 13/327; A63F 13/33; A63F 13/332; A63F 13/335; A63F 13/35; G06Q 10/10; G06Q 10/107; H04L 29/06; H04L 29/08072; H04L 29/08135

USPC ............... 463/40–43; 709/201, 203–205, 248

See application file for complete search history.

(56) References Cited

U.S. PATENT DOCUMENTS

| | | | | |
|---|---|---|---|---|
| 6,050,898 | A * | 4/2000 | Vange et al. | 463/42 |
| 6,763,371 | B1 * | 7/2004 | Jandel | 709/204 |
| 2001/0041612 | A1 * | 11/2001 | Garahi et al. | 463/29 |
| 2001/0044339 | A1 * | 11/2001 | Cordero et al. | 463/42 |
| 2003/0177187 | A1 * | 9/2003 | Levine et al. | 709/205 |
| 2003/0224858 | A1 | 12/2003 | Yoseloff et al. | |
| 2006/0281541 | A1 | 12/2006 | Nguyen et al. | |
| 2006/0287099 | A1 * | 12/2006 | Shaw et al. | 463/42 |
| 2007/0088850 | A1 * | 4/2007 | Alperin et al. | 709/246 |
| 2010/0093441 | A1 * | 4/2010 | Rajaraman et al. | 463/42 |
| 2011/0136577 | A1 * | 6/2011 | Dietz et al. | 463/43 |
| 2011/0319169 | A1 * | 12/2011 | Lam et al. | 463/42 |
| 2012/0094766 | A1 * | 4/2012 | Reynolds et al. | 463/42 |
| 2012/0165100 | A1 * | 6/2012 | Lalancette et al. | 463/42 |
| 2012/0244950 | A1 * | 9/2012 | Braun | 463/42 |
| 2013/0045803 | A1 * | 2/2013 | Kang et al. | 463/42 |

FOREIGN PATENT DOCUMENTS

| | | |
|---|---|---|
| AU | 702015 | 2/1999 |
| EP | 1 502 634 A2 | 2/2005 |
| EP | 2 211 299 A2 | 7/2010 |
| WO | 2005/028054 A1 | 3/2005 |

OTHER PUBLICATIONS

International Search Report, dated Sep. 9, 2013, and Written Opinion, issued in related International Application No. PCT/EP2013/060641.

"Cross-platform," Apr. 17, 2012, retrieved from the Internet: URL: http://en.wikipedia.org/w/index.php?title=Cross-platform&oldid=487867404, retrieved on Jul. 1, 2013, pp. 1-6.

"Minecraft," May 2, 2012, retrieved from the Internet: URL: http://en.wikipedia.org/w/index.pho?title=Minecraft&olid=490326251, retrieved on Jul. 1, 2013, pp. 1-5.

"Best iOS/Android cross-platform mobiledevelopment SKDs," Sep. 26, 2011, retrieved from the Internet: URL: http://webification.com/best-isoandroid-cross-platform-mobile-development-sdks, retrieved on Jul. 2, 2013, pp. 1-2.

* cited by examiner

*Primary Examiner* — Milap Shah

(74) *Attorney, Agent, or Firm* — Saul Ewing LLP

(57) ABSTRACT

A method and apparatus is disclosed for enabling interactive gameplay across multiple platforms.

15 Claims, 6 Drawing Sheets

METHOD AND APPARATUS FOR INTERACTIVE GAMEPLAY ACROSS MULTIPLE COMPUTING PLATFORMS

FIELD

The embodiments relate generally to an interactive game system that enables players to engage in a common interactive game using different computing platforms.

BACKGROUND

Interactive video games among multiple players within a social network have become increasingly popular. For example, the assignee of this application is the creator of Bubble Witch Saga™, a popular game that can be played on facebook®. In Bubble Witch Saga, a particular player is faced with challenges of increasing difficulty. A player can engage in an interactive game with other users within his or her social network such that they can play the same Bubble Witch Saga game. When each player logs in to facebook and initiates the Bubble Witch Saga game, he or she will be provided with current information about the other players in the game, such as the status of each player (score, level, etc.), the names of players who are playing at the current time, and the names of players who have recently joined the game. The platform in this situation would be the facebook environment, where each player accesses the game using a web browser through facebook and the game is enabled by a server that communicates with each player's web browser using API's in the facebook environment.

One limitation of the prior art systems is that players can only engage in a common interactive video game if they are using the same platform. At present, it is not possible to engage in a common interactive game from different platforms, such as the facebook environment and an 'iOS' environment (an operating system created and operated by Apple Inc. and used by mobile devices including iPhone® and iPad®) and Android® based environments used by other mobile devices. It also is not possible to engage in a common interactive game when a user does not have network connectivity.

What is needed is a gameplay system that can be accessed by users of different platforms. What is further needed is a gameplay system that allows play to continue even when a user has lost network connectivity and to synchronize once the user has regained network connectivity.

DETAILED DESCRIPTION OF ONE OR MORE EMBODIMENTS

Figure 1:
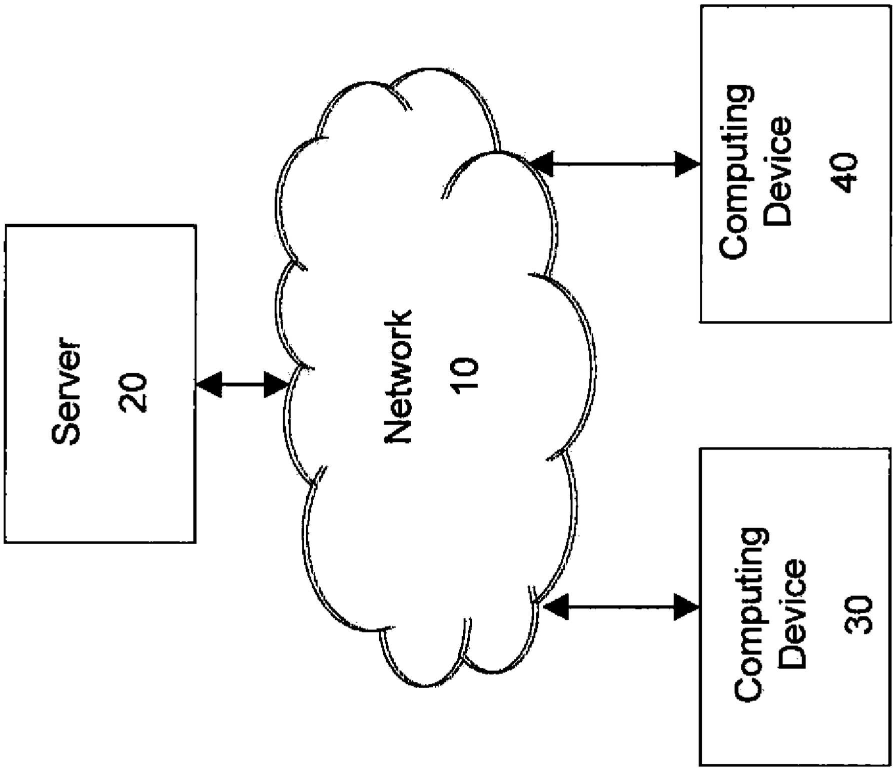
FIGURE 1 (Prior Art)
FIG. 1 is a block diagram of a prior art interactive game system.

FIG. 1 depicts a prior art system in which exemplary computing devices 30 and 40 are coupled to server 20 across network 10. Computing devices 30 and 40 each can be a desktop, notebook, server, mobile device, or any other type of device with network connectivity. Network 10 can be a LAN, WAN, the Internet, or any other type of network. Computing devices 30 and 40 and server 20 each are coupled to network 10 using wired connections (such as Ethernet, DSL, cable modems, or other known wired connections) or wireless connections (such as 802.11, CDMA, EDGE, EV-DO, or other known wireless connections). Notably, in this prior art system, all communication between computing device 30, computing device 40, and server 20 occur using a common protocol, such as HTTP or an API.

Figure 2:
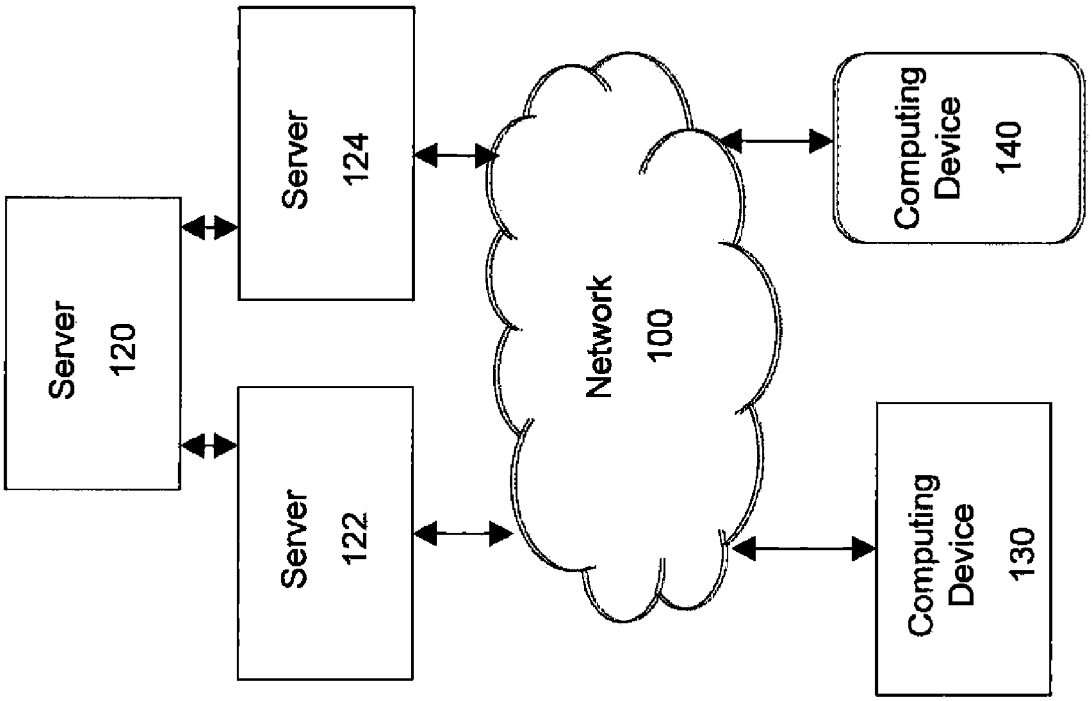
FIG. 2 illustrates an embodiment of a system that enables an interactive game by computing devices of different platforms.

FIG. 2 depicts an embodiment of the present invention. Computing device 130 is coupled to server 122 over network 100. Computing device 140 is coupled to server 124 over network 100.

In this example, computing device 130 is a PC running a first platform, such as the facebook environment. Server 122 is configured to communicate with computing devices running the first platform, such as computing device 130. For example, server 122 can be configured to communicate using facebook APIs with computing devices running the first platform.

Computing device 140 is a mobile device running a second platform, such as an iPhone application or Android® application. Server 124 is configured to communicate with computing devices running the second platform, such as computing device 140. For example, server 124 can be configured to communicate using a proprietary API with computing devices using the second platform. Server 122 and server 124 are coupled to server 120.

Figure 3:
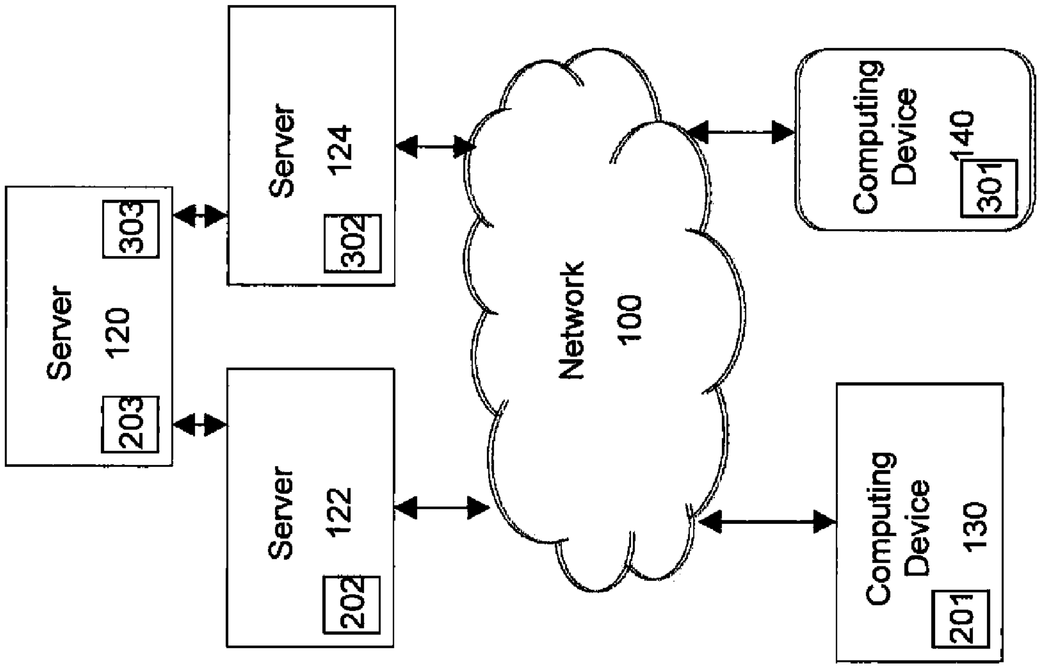
FIG. 3 illustrates the embodiment for FIG. 2 with various data structures.

In this embodiment, User A (the user of computing device 130) and User B (the user of computing device 140) are able to play an interactive game together. With reference now to FIG. 3, the same structures from FIG. 2 are shown. Computing device 130 creates and stores data structure 201 for User A, and computing device 140 creates and stores data structure 301 for User B. Server 122 creates and stores data structure 202 for User A, and server 124 creates and stores data structure 302 for User B. Server 120 creates and stores data structure 203 for User A and data structure 303 for User B. Each of these data structures comprise common fields and sub-fields, such as the fields and sub-fields shown in Table 1:

TABLE 1

| FIELDS | SUB-FIELDS |
|---|---|
| Data structure ID | |
| User ID | Name, Email address, Photo |
| Game ID | |
| Timestamp of last data structure update | |
| Status of Game Progress | Level, Points, Items Obtained |
| In-Game Purchases | Amount of purchase, timestamp of purchase, item purchase, status of use of purchase within game |
| In-Game Virtual Currency | Amount, timeline of use of currency |
| Other Players | For each other player: User ID, Data Structure ID, Status of Game Progress (and sub-fields) |

Optionally, data structures 202, 203, 302, and 303 can be tables in a database, such as a MySQL database, wherein the key is the Data Structure ID, Game ID, or User ID. The database storing data structure 202 can run on server 122, the database storing data structure 302 can run on server 124, and the database or databases storing data structures 203 and 303 can run on server 120. Optionally, data structures 201 and 301 can be tables in databases running on computing device 130 and computing device 140, respectively.

Figure 4:
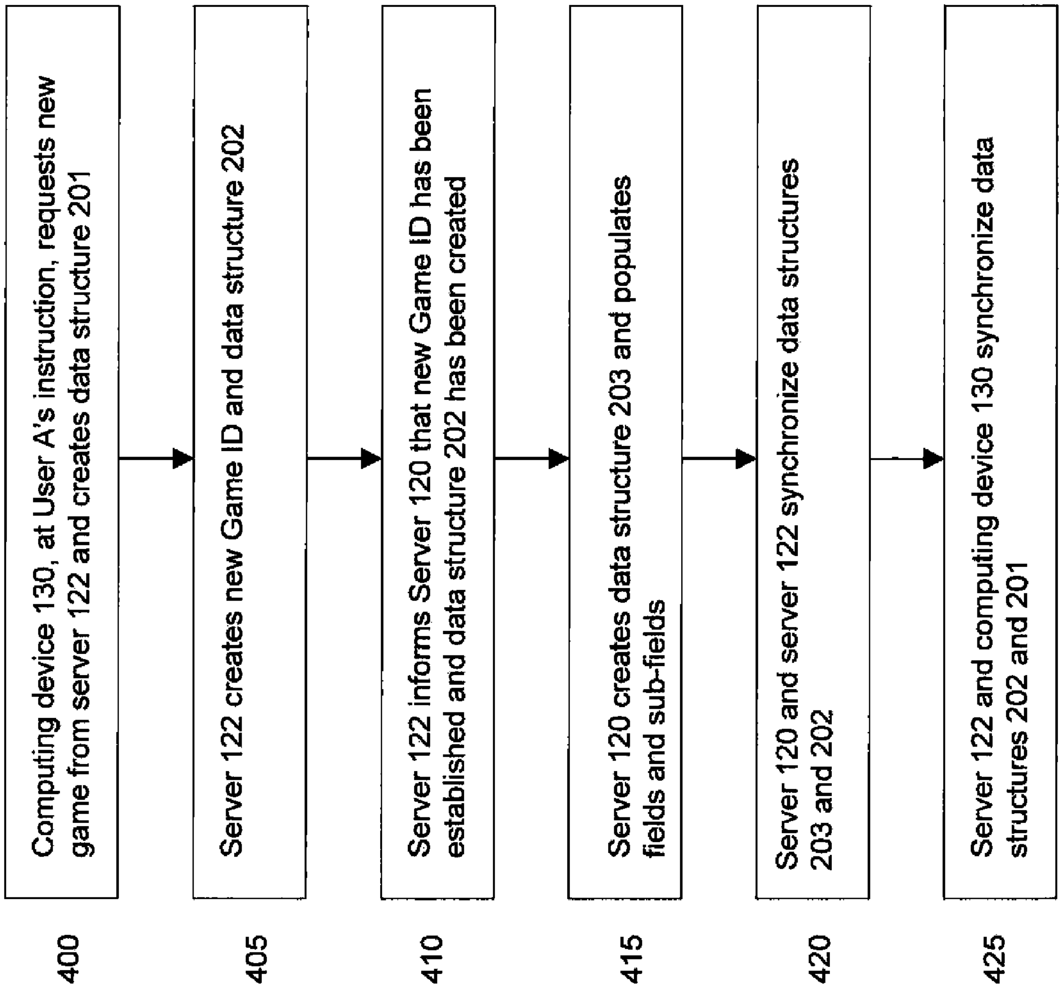
FIG. 4 illustrates an embodiment for creating a new interactive game session.

Referring now to FIG. 4, the initiation of an interactive game in an embodiment will now be discussed. In this example, computing device 130, at User A's instruction, requests a new game to be created by sending a message to server 122, and computing device 130 creates data structure 201 (step 400). Server 122 then creates a new Game ID and data structure 202 (step 405). Server 122 sends a message to server 120 that the new Game ID has been created and that data structure 202 has been created (step 410). Server 120 then creates data structure 203 and populates the fields and sub-fields (step 415). Server 120 and server 122 then synchronize data structure 203 and data structure 202 using the synchronization process described below (step 420). Server 122 and computing device 130 then synchronize data structure 202 and data structure 201 using the synchronization process described below (step 425).

Figure 5A:
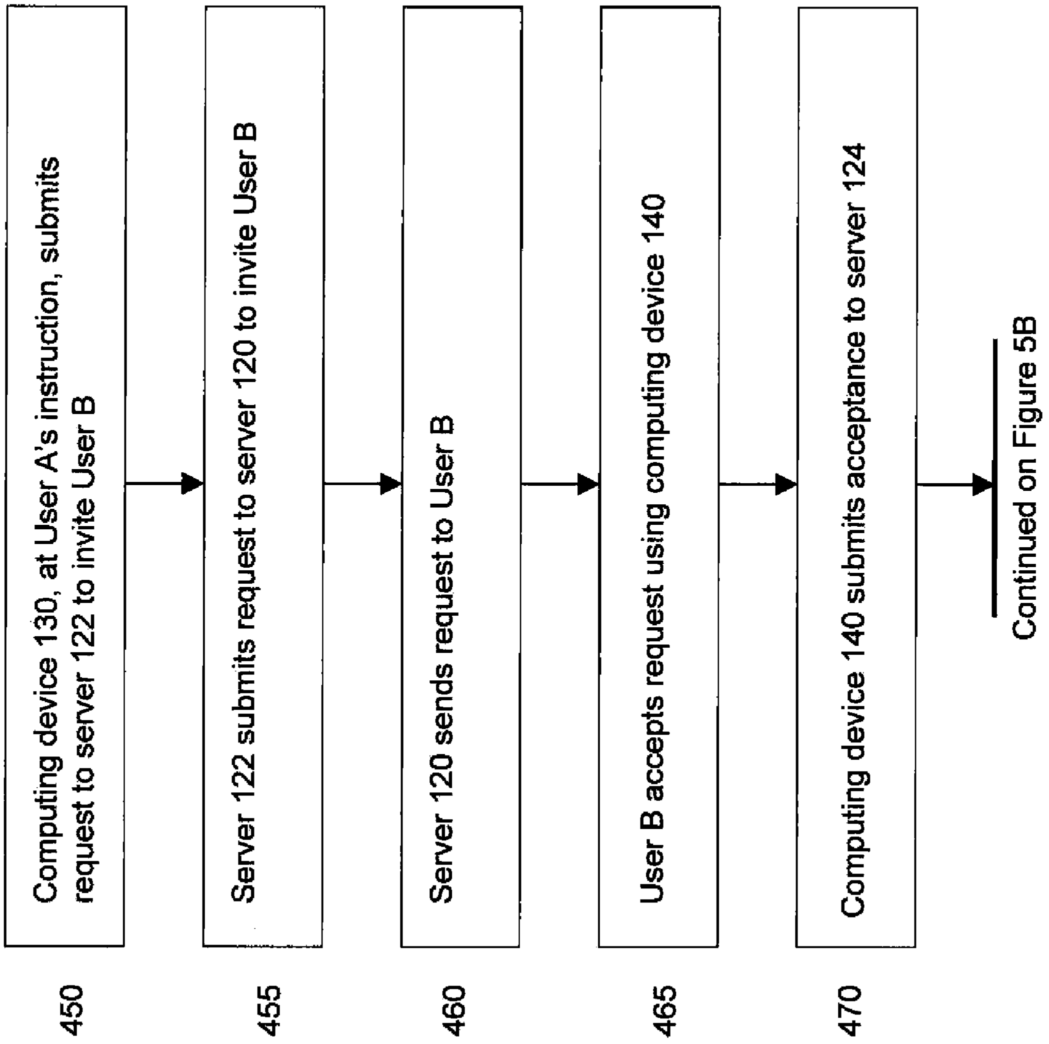
FIGS. 5A and 5B illustrate an embodiment for adding a new player to an interactive game.
Figure 5B:
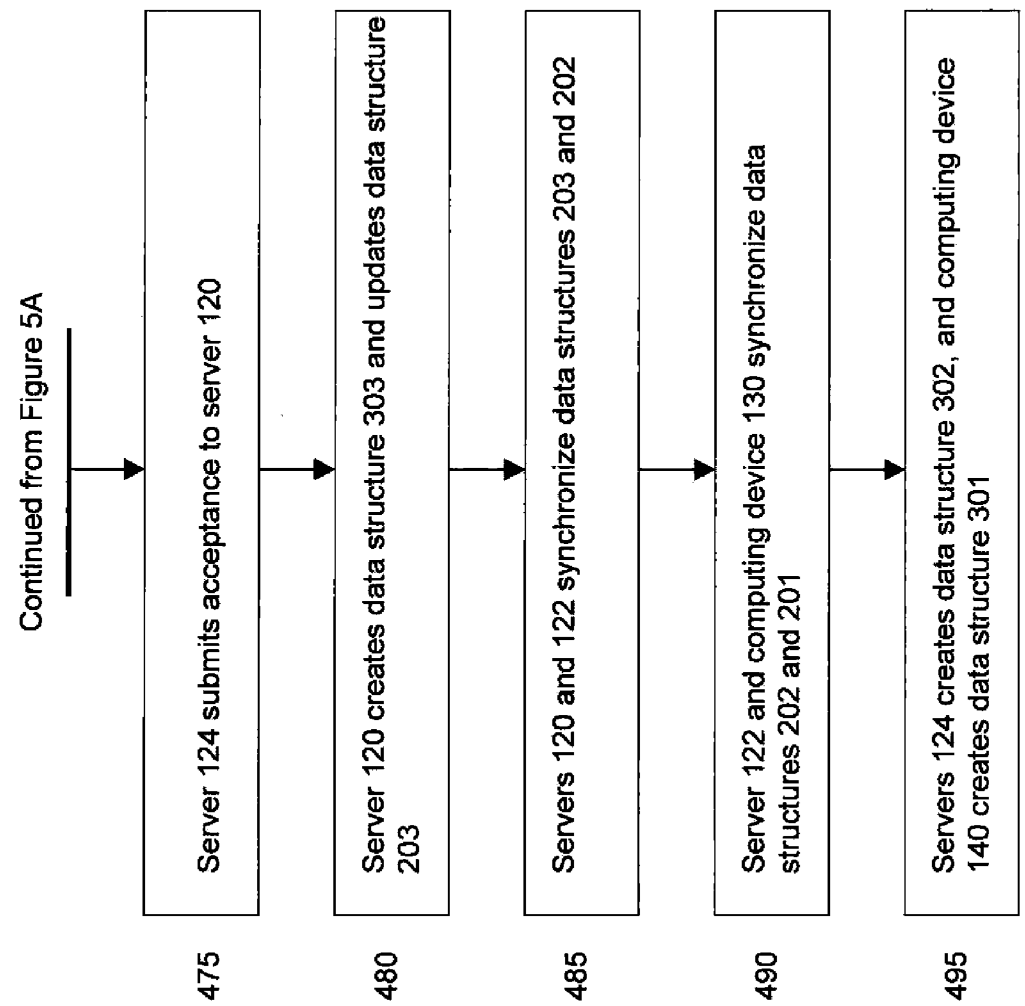

With reference now to FIGS. 5A and 5B, adding an additional player to the interactive game described previously with reference to FIG. 4 will now be discussed. In this example, computing device 130, at User A's instruction, submits a request to server 122 to invite User B to the interactive game (step 450). Server 122 submits the request to server 120 to invite User B (step 455). Server 120 then sends a request to User B to join the game (step 460). This request can be by email, SMS or MMS text message, an API sent directly to an application running on a computing device associated with User B, or another communication mechanism. User B then accepts the request using computing device 140 (step 465). The acceptance can be made by selecting a web link, responding by email, responding by SMS or MMS text message, selecting a button within an application, or any other communication mechanism. Computing device 140 transmits the acceptance to server 124 (step 470). Server 124 transmits the acceptance to server 120 (step 475). Server 120 creates data structure 303 and updates data structure 203 (step 480). Server 120 and server 122 synchronize data structures 203 and 202 (step 485). Server 122 and computing device 130 synchronize data structures 202 and 201 (step 490). Server 124 creates data structure 302 based on data structure 303, and computing device 140 creates data structure 301 based on data structure 302 (step 495).

In this example, server 122 communicates with computing device 130 using a first API (such as the facebook API), and server 124 communicates with computing device 140 using a second API (such as a proprietary API designed for use with an iPhone or Android device as the case may be). Server 122 and server 124 can communicate with server 120 using the first and second APIs, respectively, or using a third API or protocol (such as an API for inter-server communications).

An embodiment of a synchronization process will now be discussed. In the embodiments described thus far, data structures 201, 202, and 203 correspond to user A, and data structures 301, 302, and 303 correspond to User B. Optionally, server 120 can create and store a master game data structure 400 for the game that User A and User B have joined. Master game data structure 400 can contain the same fields and sub-fields describe previously for data structures 201, 202, 203, 301, 302, and 303.

During game play, User A will interact with computing device 130 and User B will interact with computing device 140. Computing device 130 runs local application 135 (not shown), and computing device 140 runs local application 145 (not shown). Local application 135 will update data structure 201 as User A progresses through the game. Local application 145 will update data structure 301 as User B progresses through the game. User A and User B need not necessarily be playing at the same time.

In the situation where User A is playing the game, periodically (such as every 100 ms) computing device 130 will send a synchronization request to server 122. The request will contain a timestamp. If that timestamp indicates a later time than the timestamp in data structure 202, then data structure 202 will be written over with the data from data structure 201 as to fields and sub-fields that have changed and the timestamp field of data structure 202 will be updated with the timestamp in the initial request from computing device 130. However, if the "Other Players" field and sub-field of data structures 201 and 202 do not match, then the "Other Players" field and sub-fields of data structure 201 will be overwritten with the data from data structure 202, because this mismatch would only occur if the status of other players had changed since the last synchronization event, in which case data structure 202 would contain the more recent data for the "Other Players."

Periodically, server 122 will send a synchronization request to server 120. If the timestamp of data structure 202 indicates a later time than the timestamp in data structure 203, then data structure 203 will be written over with the data from data structure 202 as to fields and sub-fields that have changed and the timestamp field of data structure 203 will be updated with the timestamp of data structure 202. However, if the "Other Players" field and sub-field of data structures 202 and 203 do not match, then the "Other Players" field and sub-fields of data structure 202 will be overwritten with the data from data structure 203, because this mismatch would only occur if the status of other players had changed since the last synchronization event, in which case data structure 203 would contain the more recent data for the "Other Players."

If the timestamp of data structure 203 indicates a later time than the timestamp in master game data structure 400, then master game data structure 400 will be written over with the data from data structure 203 as to fields and sub-fields that have changed and its timestamp field will be updated with the timestamp of data structure 203. However, if the "Other Players" field and sub-field of master game data structure 400 and data structure 203 do not match, then the "Other Players" field and sub-fields of data structure 203 will be overwritten with the data from master game data structure 400, because this mismatch would only occur if the status of other players had changed since the last synchronization event, in which case master game data structure 400 would contain the more recent data for the "Other Players."

This synchronization process between computing device 130, server 122, and server 120 has been described thus far with reference to changes in the status of User A. It will be understood by one of ordinary skill in the art that the same changes could occur in data structures 301, 302, and 303 and master game data structure 400 with reference to changes in the status of User B.

The changes in data structures as to User A will now propagate to the data structures associated with User B. Periodically, server 120 will compare the timestamp fields of master game data structure 400 and data structure 303. If the timestamp of master game data structure 400 is a later time than that of data structure 303, then data structure 303 will be written over with the data from master game data structure 400 as to "Other Players" field and sub-fields that have changed and the time stamp of data structure 303 will be updated with the time stamp of data structure 400.

Periodically, server 120 will send a synchronization request to server 124. The request will contain the timestamp from data structure 303. If that timestamp indicates a later time than the timestamp in data structure 302, then data structure 302 will be written over with the data from data structure 303 as to the "Other Players" field and sub-fields that have changed.

Periodically, server 124 will send a synchronization request to computing device 140. The request will contain the timestamp from data structure 303. If that timestamp indicates a later time than the timestamp in data structure 302, then data structure 302 will be written over with the data from data structure 303 as to "Other Players" field and sub-fields that have changed.

Thus, it will be appreciated that User A and User B can engage in an interactive game through this synchronization process.

An embodiment enabling "airplane mode" will now be described. If User B loses connectivity to network 100 on computing device 140 (as might occur, for example, if computing device 140 is on an airplane or has lost WiFi or cellphone connectivity), then User B can continue to play the game on computing device 140 using local application 145. Local application 145 will continue to update data structure 301. When computing device 140 regains connectivity to network 100, computing device 140 will initiate the synchronization process described above. In this manner, User A will learn of the changes in User B's status even though the changes had occurred while User B was not connected to network 100.

The embodiments have been described as to two users, User A and User B, but it will be appreciated by one of ordinary skill in the art that the embodiments can accommodate any number of players. Similarly, the embodiments have been described as to two computing devices using two different platforms, computing device 130 and 140, but it will be appreciated by one of ordinary skill in the art that the embodiments can accommodate any number of computing devices utilizing any number of different platforms.

In addition, while the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A gaming system configured to enable cross-device gameplay of a common interactive game, the gaming system comprising:

a first server configured to communicate with a first computing device of a first type configured to engage with the common interactive game, the first server comprising a first data storage device, the first data storage device comprising a first data structure having at least one field comprising a first timestamp field;

a second server configured to communicate with a second computing device of a second type, different than the first type, configured to engage with the common interactive game, the second server comprising a second data storage device, the second data storage device comprising a second data structure having at least one field comprising a second timestamp field; and a third server configured to communicate with the first server and the second server, the third server comprising a third data storage device comprising at least one third data structure having a plurality of fields corresponding to each of the at least one field of the first data structure and each of the at least one field of the second data structure, the plurality of fields further comprising a third timestamp field;

wherein the first server, the second server, and the third server are configured to synchronize the first data structure, the second data structure, and the at least one third data structure to enable the first computing device and the second computing device for the engagement in the common interactive game;

wherein synchronization of the first data structure and the one or more third data structures corresponding to the first data structure is dependent on a result of a comparison of the first timestamp field and the third timestamp field; and wherein synchronization of the second data structure and the one or more third data structures corresponding to the second data structure is dependent upon a result of a comparison of the second timestamp field and the third timestamp field.

2. The system of claim 1, wherein the first server is configured to communicate with the first computing device using a first Application Programming Interface (API).

3. The system of claim 2, wherein the second server is configured to communicate with the second computing device using a second API different from the first API.

4. The system of claim 1, wherein at least one of the first and second computing devices comprise one of a desktop computer and a mobile device.

5. The system of claim 1, wherein the at least one data structure of the third data store is for an interactive game.

6. The system of claim 5, wherein the data structure comprises information for a plurality of players in the game.

7. The system of claim 1 wherein one of the first and second data structures comprises information about a user associated with the other of the first and second data structures.

8. The system of claim 1, wherein at least one data structure comprises a game identifier.

9. The system of claim 1, wherein at least one of said first and second servers is configured to create the respective data structure in that server in response to a request for a new game from a respective one of the first and second computing devices.

10. The system of claim 9, wherein said third server is configured to create the respective data structure in the third server in response to a message from said at least one server which has created the respective data structure.

11. The system of claim 1, wherein said third server is configured to cause one of said first and second servers to create one of the first and second data structures in response to creation of the other of said first and second data structures.

12. The system of claim 1, wherein at least one of said first and second servers is configured to create a service data structure in response to a message from said third server.

13. A method of enabling cross-device interactive gameplay of a common interactive game, comprising the steps of:

(i) displaying the common interactive game on a first computing device of a first type, wherein the first computing device comprises a first data storage device having a first data structure;

(ii) establishing communication between the first computing device and a first server, the first server comprising a first server data storage device, the first data storage device comprising a first server data structure having at least one field comprising a first timestamp field;

(iii) displaying the common interactive game on a second computing device of a second type, different than the first type, configured to engage with the common interactive game, the second computing device comprising a second data storage device different than the first data storage device comprising a second data structure;

(iv) establishing communication between the second computing device and a second server, the second server comprising a second server data storage device different than the first server data storage device, the second data storage device comprising a second server data structure comprising at least one field comprising a second timestamp field;

(v) synchronizing the first data structure and the first server data structure;

(vi) synchronizing the first server data structure and the second server data structure in dependence upon the values of the first timestamp field and the second timestamp field; and (vii) synchronizing the second server data structure and the second data structure.

14. The method of claim 13, wherein the step of synchronizing the first server data structure and the second server data structure is performed on a third server.

15. The method of claim 14 further comprising the steps of:

creating the first data structure at the first computing device;

creating the first server data structure at the first server; and creating a third server data structure at the third server.

* * * * *